United States Patent [19]
Kiyomura

[11] Patent Number: 5,378,337
[45] Date of Patent: Jan. 3, 1995

[54] ELECTRICAL NUCLEATION DEVICE FOR SUPERCOOLED HEAT STORAGE MEDIUM

[75] Inventor: Masahiro Kiyomura, Fujisawa, Japan

[73] Assignees: Nok Corporation, Tokyo; Toyota Jidosha Kabushiki Kaisha, Toyota, both of Japan; a part interest

[21] Appl. No.: 56,869

[22] Filed: May 5, 1993

[30] Foreign Application Priority Data

May 12, 1992 [JP] Japan .............. 4-031034[U]

[51] Int. Cl.⁶ .................. C25B 9/00; C25B 15/00; C25C 7/00
[52] U.S. Cl. .................. 204/228; 204/242; 204/243 R; 204/290 R; 204/292; 204/241; 204/DIG. 6
[58] Field of Search ............ 204/60–62, 204/242, 243 R, 244–247, 290 R, 241, 228, 292, 267, DIG. 6

[56] References Cited
U.S. PATENT DOCUMENTS

| | | | |
|---|---|---|---|
| 3,380,907 | 4/1968 | Wurm | 204/243 R |
| 3,806,433 | 4/1974 | Diller | 204/243 R X |
| 4,460,546 | 7/1984 | Kapralis et al. | 422/245 |
| 4,529,488 | 7/1985 | Kotani et al. | 204/290 R |
| 4,855,030 | 8/1989 | Miller | 204/243 R X |
| 4,936,971 | 6/1990 | Pohto | 204/290 R X |

FOREIGN PATENT DOCUMENTS
61-204293 9/1986 Japan .
3-96335 10/1991 Japan .

OTHER PUBLICATIONS
Mullin, J. W., Crystallization, 3 Rev. ed, 172 (1993).
R. Stuart Tipson, Techniques of Organic Chemistry, vol. 3, 414 (1950).
Journal of Japan Association of Crystal Growth 9 (1982).
Journal of Crystal Growth 99 (1990) 72–76.

*Primary Examiner*—Donald R. Valentine
*Attorney, Agent, or Firm*—Jacobson, Price, Holman & Stern

[57] ABSTRACT

A device for electrically nucleating a supercooled melt of heat storage medium to artificially induce crystallization. The device includes a metallic electrode to which a rigid cover member is secured in tight mechanical contact therewith. A trace of a hydrate of salt forming the heat storage medium is retained in the form of molecular clusters between the electrode and the rigid member. Upon application of an electric voltage, the molecular clusters grow into crystal nuclei to trigger crystallization. A method of making the electrode assembly is also disclosed.

7 Claims, 5 Drawing Sheets

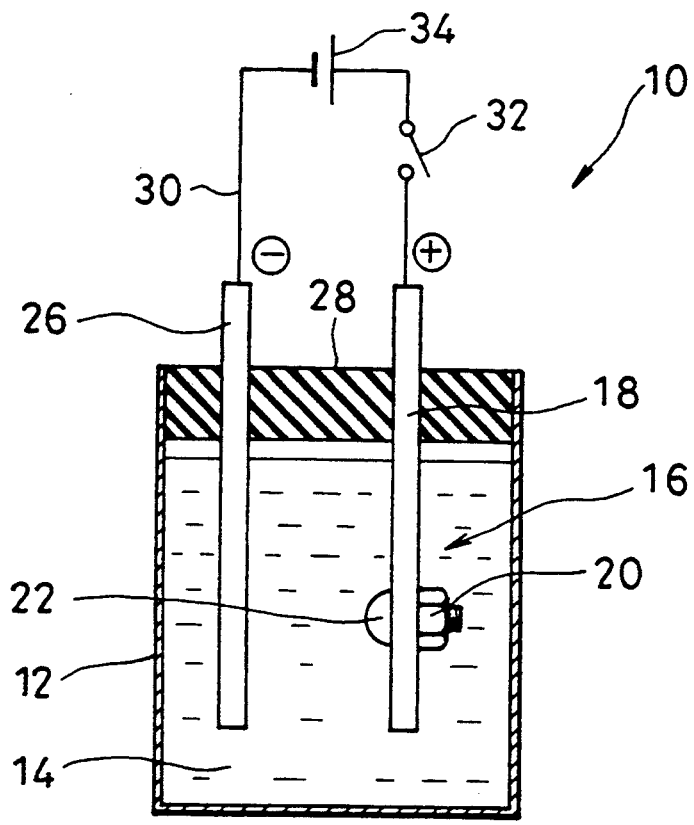
FIG. 1
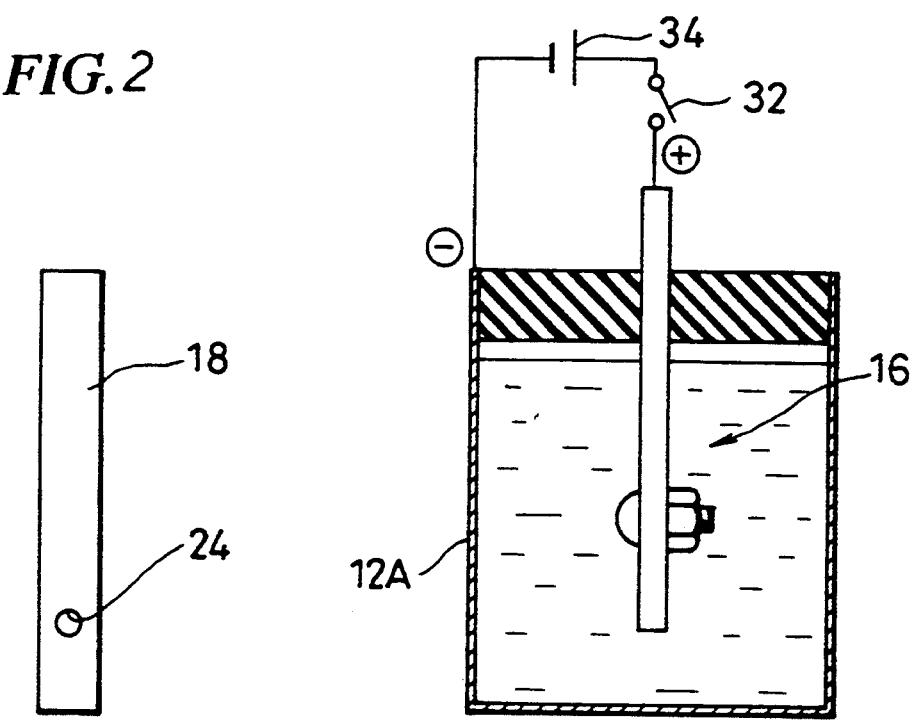
FIG. 2
FIG. 3

ELECTRICAL NUCLEATION DEVICE FOR SUPERCOOLED HEAT STORAGE MEDIUM

BACKGROUND OF THE INVENTION

1. Field of the Invention

The present invention relates to a nucleation device for electrically inducing crystallization of a supercooled, liquid-state, heat storage medium. This invention is also concerned with a sub-assembly of such device and a method of making the same.

2. Description of the Prior Art

It is well-known in the art to use a heat storage medium of the phase change species which is adapted to utilize the latent heat absorbed and evolved during a phase change between liquid and solid states. When a crystalline heat storage medium is heated to fuse, it absorbs the heat of fusion. As the melt is thereafter allowed to crystallize, it evolves an equal amount of heat, known as the heat of solidification, which may be utilized in various heating applications.

Most typically, heat storage medium of the phase change species includes hydrate of various salts, such as $NaCH_3COO \cdot 3H_2O$, $CaCl_2 \cdot 6H_2O$, $Na_2SO_4 \cdot 10H_2O$, $Na_2CO_3 \cdot 10H_2O$, $Na_2HPO_4 \cdot 12H_2O$, $Ca(NO_3)_2 \cdot 4H_2O$, $Na_2S_2O_3 \cdot 5H_2O$, $KAl(SO_4)_2 \cdot 12H_2O$ and $NH_4Al(SO_4)_2 12H_2O$. One of the features common to these hydrates of salt as used as a heat storage medium is that they tend more or less to be supercooled. For example, When heated, trihydrate of sodium acetate ($NaCH_3COO \cdot 3H_2O$) begins to melt at the melting point thereof which is about 58° C. However, when molten trihydrate of sodium acetate is allowed to cool, it does not freeze at 58° C. but can be cooled metastably down to about −10° C. to −20° C. before crystallization occurs spontaneously. Such cooling of a liquid below the freezing point without solidification taking place is known as supercooling.

In certain applications, such as solar systems and heating systems powered by midnight electric, wherein storage and utilization of heat must be cyclically repeated, supercooling of the heat storage medium is undesirable because it hinders smooth heat cycling between absorption and evolution of heat. In such applications, it is desirable to interrupt or destroy the supercooled state by artificially inducing the supercooled melt to crystallize.

In other applications, to the contrary, supercooling of the heat storage medium may rather advantageously be utilized. For instance, trihydrate of sodium acetate which has a spontaneous solidification temperature of −10° C. to −20° C. as aforementioned may metastably remain in its supercooled liquid state at the ambient temperature. If liquid-state trihydrate of sodium acetate as supercooled down to the ambient temperature is artificially induced to crystallize at any point of time, a change of state will occur to evolve the latent heat. In the latter applications, therefore, one may control at its option the timing at which the latent heat is allowed to evolve for utilization.

Accordingly, the techniques of artificial crystallization inducement of the supercooled heat storage medium are useful in two ways.

In order to artificially induce a supercooled liquid to crystallize, it may be contacted with crystal seeds or nuclei. Otherwise, it is necessary to subject it to various nucleation treatments, such as scratching, friction, agitation, mechanical shock, extreme pressure, electric and magnetic fields, that lead to formation of crystal nuclei (J. W. Mullin, Crystallization, 3rd ed., 172 (1993); and, R. Stuart Tipson, Techniques of Organic Chemistry, Vol. 3, 414 (1950), New York).

The present inventor has previously proposed a trigger device disclosed in Japanese Utility Model Kokai Publication No. 3-96335 published Oct. 2, 1991. This device includes crystal seeds sandwiched between a leaf spring and a nut fastened thereto by a screw. By manually applying a pressure on the screw to bend the leaf spring away from the nut, supercooled liquid is contacted with the crystal nuclei to trigger crystallization. U.S. Pat. No. 4,460,546 granted to Kapralis et al discloses a mechanical nucleation trigger including a thin metallic strip having pin-hole size openings. When the trigger is snap-deformed, the edges of the openings may rub against one another to result nucleation. The disadvantage of these mechanical trigger devices is that electric or electronic control of crystallization or nucleation is difficult to achieve.

Electrical nucleation method disclosed in U.S. Pat. No. 4,529,488 granted to Kotani et al appears to have the advantage of being adapted to control nucleation by electric signals (also see Kotani et al., Journal of Japan Association of Crystal Growth 9, 31 (1982)). In this method, a supercooled melt or a supersaturated solution of salt is nucleated by application of an electric voltage. Kotani et al proposes use of electrodes of various materials including amalgamated copper which are occasionally covered by polymeric material to prevent electrode exhaustion. Kotani et al state that, while the mechanism of electrical nucleation is not clear, it is considered that an electric current changes the characteristics of the electrode surface or liquid to cause nucleation. In a later report, Kotani et al and their coauthors acknowledge that some activation treatment of electrodes was necessary in order to successfully nucleate hydrate of sodium acetate with copper-amalgam electrodes (Journal of Crystal Growth 99, 72–76 (1990)). Japanese Patent Kokai Publication No. 61-204293, published Sep. 10, 1986, also proposes to electrically nucleate supercooled trihydrate of sodium acetate.

However, the problem associated with the electrical nucleation method as taught by the prior art is that nucleation does not occur with a practical degree of reliability and repetitiveness. Thus, according to the experiments conducted by the present inventor, it has been found that some electrodes have completely failed to nucleate and that certain electrodes, while operative at the outset, have lost their nucleation function only after several tens of times of nucleation.

Accordingly, an object of the present invention is to provide an electrical nucleation device which possesses a high degree of certainty and reliability of nucleation.

Another object of the invention is to provide an electrical nucleation device which has a high degree of durability.

A still another object of the invention is to provide an electrical nucleation device which is capable of withstanding more than hundreds, preferably thousands of times of nucleation.

A further object of the invention is to provide an electrical nucleation device which is feasible for practical heat storage applications wherein storage and evolution of the latent heat are repeated for an extended period of time.

Another object of the invention is to provide a method of making an electrical nucleation device which is feasible to achieve the foregoing objects.

SUMMARY OF THE INVENTION

The present inventor has found as a result of investigations and researches that, although the electrochemical mechanism of nucleation cannot be visually confirmed, molecular aggregates or clusters, or sub-nucleus or pre-nucleus embryos, of hydrate of salt which are smaller in size than crystal nuclei and which are adsorbed on the surface of the anode play an important role in electrical nucleation and that their presence is essential. It is believed that, upon application of an electric voltage, liquid state discrete molecules are merged or cohered with the molecular clusters being present on the anode surface to permit the clusters to grow into crystal nuclei that trigger crystallization. It is considered that these sub-nucleus molecular clusters or embryos have an affinity with a fresh metallic surface of the anode but readily disappear as the anode surface is oxidized.

In its simplest form, the electrical nucleation device according to the present invention includes an anode made of a metal such as silver, palladium and lead. When the electrical nucleation device is used in combination with trihydrate of sodium acetate, an anode of silver is most preferable. The anode must be subjected to abrasive treatment, such as filing, sandpapering and shot blasting, to provide a fresh, preferably roughened surface. A rigid member, such as a metallic nut or washer, is rigidly fastened to the anode in tight mechanical contact therewith for closely covering at least in part the fresh surface of the anode. A trace of hydrate of salt, which is identical in composition to the compound forming the heat storage medium in combination with which the nucleation device is intended to be used, is retained or confined between the anode and the rigid member tightly secured thereto.

The trace of hydrate of salt as retained between the anode and the rigid member is in the form of molecular clusters or aggregates or sub-nucleus or pre-nucleus embryos of the hydrate of salt. The molecular clusters may be formed in a variety of ways. For example, they may be formed by applying or depositing crystalline particles or powders of hydrate of salt on the fresh surface of the anode, fastening the rigid member to the anode with the particles sandwiched therebetween, and heating the thus assembled anode and rigid member at a temperature above the melting point of the hydrate of salt. By bodily heating the anode assembly, the crystal powders will be fused to form a melt containing molecular clusters. It is considered that the thus formed clusters are retained on the anode surface by adsorption. It is important that the melt is not overly heated during fusion. Otherwise, the clusters will be dissolved or disintegrated into liquid state molecules. In the case of trihydrate of sodium acetate, heating may preferably be conducted at a temperature of 58°–90° C.

Formation of molecular clusters need not necessarily be carried out after the rigid member is affixed to the anode. Thus, the crystal powders may be fused and the rigid member be thereafter fastened to the anode to confine the molecular clusters. Another way of cluster formation is to contact the assembly of anode and rigid member with a melt or solution of hydrate of salt to permit a quantity thereof to enter by capillary action between the anode and the rigid member and to cool the assembly until the melt or solution is crystallized, followed by heating. Similarly, the anode assembly may be cooled below the spontaneous freezing point of hydrate of salt and may be contacted with a melt or solution of hydrate of salt to allow it to crystallize as it enters by capillary action into the interface between the anode and the rigid member. The crystals may thereafter be fused to form molecular clusters.

In another embodiment, the crystalline powders of hydrate of salt need not be fused before the nucleation device is eventually placed in contact with the heat storage medium and may be left in the crystalline form as sandwiched between the anode and the rigid cover member. If the heat storage medium as contacted with the nucleation device has been heated at a temperature above the melting point thereof, the sandwiched powders will be fused upon contact with the medium to result formation of molecular clusters. If the heat storage medium as contacted with the nucleation device has been supercooled, crystallization of the supercooled medium will occur upon contact with the crystal powders retained in the nucleation device. In this case, however, as the heat storage medium is thereafter subjected to heating for the purposes of heat storage, the entire crystals will be fused to derive molecular clusters which will be retained in a similar manner on the anode surface. In any case, it is preferable that formation of molecular clusters is carried out while the abraded surface of the anode is fresh.

In use, the anode assembly with the molecular clusters of hydrate of salt adsorbed thereon is eventually placed in contact with a supercooled heat storage medium. Whenever nucleation is required, an electric voltage, either direct or alternating, preferably a DC voltage of 1–4 V, may be applied to the anode assembly from a suitable power source via a switched circuit. When an AC voltage is to be applied, a pair of anode assemblies may be used. When a DC voltage is used, a separate cathode made of suitable electrically conductive material may be provided or a container for the heat storage medium by itself may be used as the cathode if made of an electrically conductive material. Upon application of an electric voltage, the molecular clusters retained between the anode and the rigid cover member will grow to build up crystal nuclei. Although the cover member is sufficiently tightly secured to the anode so that apparently there is a substantially liquid-tight close mechanical contact between the anode and the cover member, it is considered that, in a microscopic or even smaller molecular scale, there is an adequate clearance therebetween that permits the crystal nuclei thus formed to be in communication with the surrounding melt of supercooled heat storage medium so that crystallization is induced with a high degree of certainty.

As electric nucleations are repeated, the surface of the anode not covered by the rigid cover member will be gradually oxidized by electrochemical reaction. However, it is found that the surface of the anode covered by the rigid member is substantially free from oxidation and is capable of withstanding oxidation for a sufficiently long period.

These features of the invention as well as other features and advantages thereof will become apparent from the following description made in conjunction with the accompanying drawings.

BRIEF DESCRIPTION OF THE DRAWINGS

Throughout different drawings, similar parts and members are indicated by like reference numerals.

FIG. 1 is a schematic cross-sectional representation showing the nucleation device according to the invention as installed in a heat storage system;

FIG. 2 is a side elevational view of the anode plate of the device shown in FIG. 1;

FIG. 3 is a cross-sectional view similar to FIG. 1 but showing another electrode layout;

DESCRIPTION OF THE PREFERRED EMBODIMENTS

Figure 4:
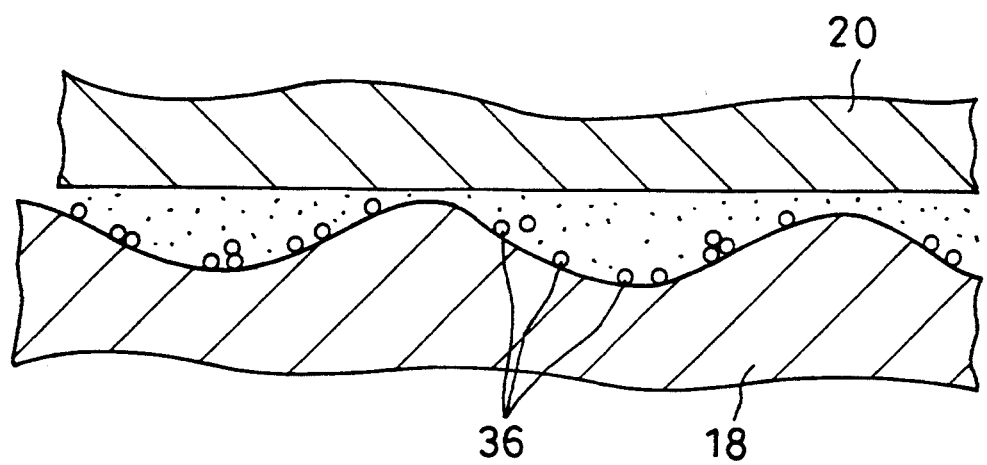
FIG. 4 is an imaginary cross-sectional view showing in a microscopically exaggerated scale the molecular clusters of heat storage compound as retained between the anode and the rigid cover member shown in FIG. 1.

Referring to the drawings, there is shown in FIG. 1 an electrical nucleation device 10 as installed in a container 12 for a heat storage medium 14. The electrical nucleation device 10 of the invention may advantageously be used to nucleate a supercooled heat storage medium comprised of trihydrate of sodium acetate ($NaCH_3COO \cdot 3H_2O$) or an aqueous solution thereof. However, the nucleation device 10 may also be used in combination with various other hydrates of salt, such as hexahydrate of calcium chloride ($CaCl_2 \cdot 6H_2O$), decahydrate of sodium sulfate ($Na_2SO_4 \cdot 10H_2O$), decahydrate of sodium carbonate ($Na_2CO_3 \cdot 10H_2O$), dodecahydrate of disodium hydrogenphosphate ($Na_2HPO_4 \cdot 12H_2O$), tetrahydrate of calcium nitrate ($Ca(NO_3)_2 \cdot 4H_2O$), pentahydrate of sodium thiosulfate ($Na_2S_2O_3 \cdot 5H_2O$), dodecahydrate of potassium alum ($KAl(SO_4)_2 \cdot 12H_2O$), and dodecahydrate of ammonium alum ($NH_4Al(SO_4)_2 \cdot 12H_2O$).

The electrical nucleation device 10 includes an anode assembly 16 having a metallic anode plate 18 preferably made of silver. The lower surface of the silver anode 18 has been subjected to abrasive treatment, such as filing, sandpapering and shot blasting, to present a roughened fresh surface. Although not shown in the drawings, crystal powders of the compound forming the heat storage medium 14 have been applied in any suitable manner onto the abraded surface of the anode plate 18 while the surface is fresh. In the illustrated embodiment, powders of trihydrate of sodium acetate have been used in an attempt that the device 10 may be used for nucleating a heat storage medium formed by trihydrate of sodium acetate.

The anode assembly 16 further includes a rigid cover or clamping member 20 rigidly and tightly secured to the anode plate 18. In the illustrated embodiment, the rigid member 20 is a nut made of stainless steel and which is fastened to the plate 18 by a screw 22. The screw 22 extends through an opening 24 provided across the anode 18 as shown in FIG. 2. By fastening the nut 20 against the anode plate 18 in a tight metal-to-metal contact with one another, a part of the applied crystal powders of trihydrate of sodium acetate will be sandwiched and clamped between the nut 20 and the anode plate 18.

In the embodiment illustrated in FIG. 1, the nucleation device 10 further includes a cathode 26 made of a suitable electrically conductive material such as graphite rod. The anode 18 and the cathode 26 are supported by a plug or lid 28 made of insulating material such as silicone rubber. The anode 18 and the cathode 26 are connected by a lead wire 30 having a switch 32 to a suitable power source such as a battery 34.

FIG. 3 shows another layout of the nucleation device wherein the container 12A made of an electrically conductive material is used to serve as a cathode.

As the anode assembly 16 is placed in contact with of the heat storage medium 14 of sodium acetate trihydrate and when the medium is heated above the melting point thereof to fuse it into melt as shown in FIGS. 1 and 3, the crystal powders sandwiched between the anode 18 and the nut 20 will also be fused. It is believed that, as a result of fusion, molecular clusters 36 of sodium acetate trihydrate are formed which are adsorbed on the fresh abraded surface of the anode 18 as schematically shown in FIG. 4 wherein small circles indicate molecular clusters of sodium acetate trihydrate and dots represent liquid state molecules of sodium acetate trihydrate. While shown greatly exaggerated in FIG. 4, it will be noted that the size of the clusters is in the order of several nanometers and the size of molecules in the order of angstroms. Therefore, although the anode plate 18 and the nut 20 are placed with each other in a tight metal-to-metal contact, it is considered that, in a microscopic or molecular scale, an adequate clearance is held therebetween to permit the clusters and the discrete molecules of sodium acetate trihydrate retained therein to be in communication with each other as well as with the surrounding melt.

Figure 5A:
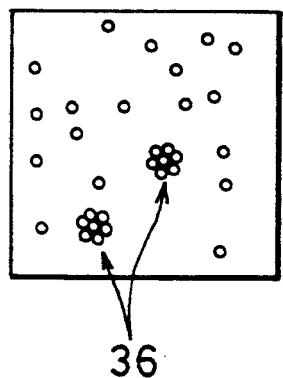
FIGS. 5A–5C are schematic imaginary views representing the process of crystal growth, with FIG. 5A showing molecular clusters existing before voltage application, FIG. 5B illustrating the cluster as grown into a crystal nucleus, FIG. 5C showing the manner of crystal growth.
Figure 5B:
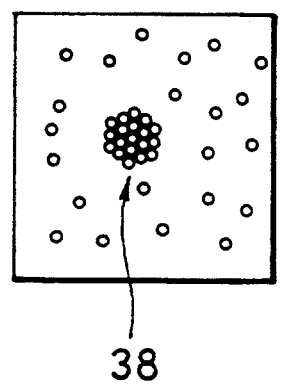
Figure 5C:
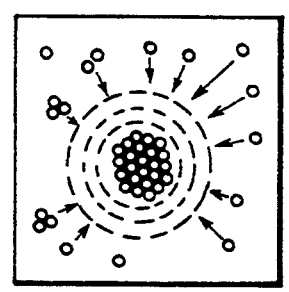

After the melt of heat storage medium is allowed to be supercooled, the switch 32 may be closed at a desired timing to nucleate the supercooled melt so as to induce crystallization. The process of nucleation and crystallization is schematically illustrated in FIGS. 5A–5C wherein small circles indicate molecules of sodium acetate trihydrate. It is considered that, upon application of an electric voltage, the molecular clusters 36 (FIG. 5A) and the molecules of sodium acetate trihydrate are merged with each other to form crystal nuclei 38 (FIG. 5B) which trigger crystal growth (FIG. 5C).

As described before with reference to FIG. 4, the microscopic clearance between the anode plate 18 and the nut 20 is large enough to permit molecular communication between the clearance and the surrounding melt. Therefore, once crystals are germinated in the clearance, crystal growth propagates radially outwardly through the clearance toward the surrounding supercooled melt.

The present inventor has tested the nucleation device 10 shown in FIG. 1. Upon application of a DC voltage of 2 V, nucleation occurred generally within several seconds, in the earliest case within one second. The device successfully outlasted more than 8,000 times of nucleation. As nucleation was repeated, the surface of the silver anode 18 not covered by the nut 20 was thinned down. Probably, this is due to oxidation taking place at the anode surface under the action of electric current in the following manner.

$$2Ag + 2OH^- \rightarrow Ag_2O + H_2O + 2e^-$$

It has been observed that nucleation never occurs at the oxidized surface of the anode. It is considered, therefore, that the molecular clusters of sodium acetate trihydrate disappear as oxidation proceeds. Surprisingly, portion of the anode 10 underlying the nut 20 withstood oxidation and remained unchanged. It is believed that the metal-to-metal contact between the silver anode plate 18 and the nut 20 is tight enough to prevent migration of the hydroxide ions.

Figure 6:
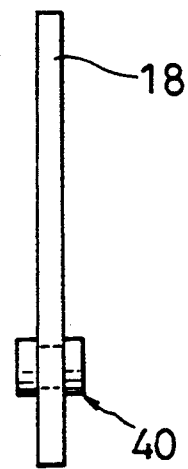
FIGS. 6–9 are elevational views showing various forms of the anode assembly.
Figure 7:
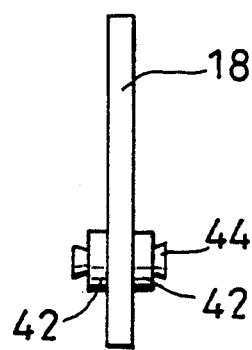
Figure 8:
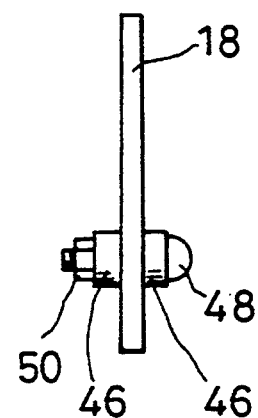
Figure 9:
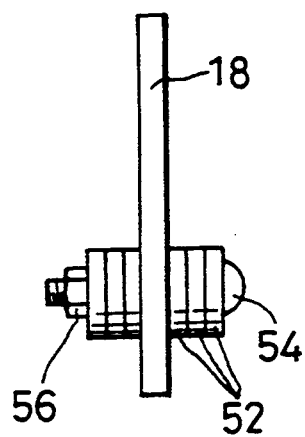

FIGS. 6-9 illustrate various other forms of the anode assembly 16 shown in FIGS. 1 and 3. The anode assembly of FIG. 6 is provided with a rivet member 40 which is crimped to the abraded silver anode plate 18. The anode assembly shown in FIG. 7 has a pair of silver washers 42 secured to the anode plate by crimping the ends of a rivet 44. In the anode assembly illustrated in FIG. 8, a pair of silver washers 46 are fastened to the anode 18 by a screw 48 and a nut 50. Throughout these embodiments, a trace of sodium acetate trihydrate in the form either of molecular clusters or crystalline powders may be similarly retained between the anode 18 and the rivet 40, or washers 42 or 46. In the anode assembly shown in FIG. 9, two stack of silver washers 52 are secured to the anode 18 by using a screw 54 and a nut 56. The end faces of each washer 52 have been abraded and a trace of sodium acetate trihydrate is similarly retained between washers. The arrangements of FIGS. 6-9 are advantageous in that an increased area is provided for retaining the molecular clusters.

Figure 10A:
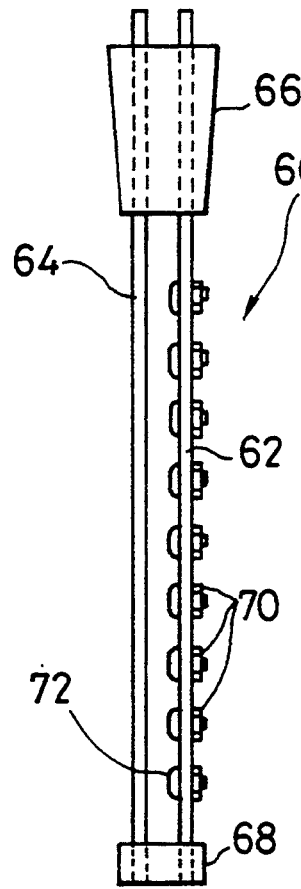
FIGS. 10A and 10B are front and side elevational views of an electrode assembly according to another embodiment of the invention.

FIGS. 10A ad 10B show an electrode assembly 60 which may be used in place of the combination of the anode assembly 16 and the cathode 26 shown in FIG. 1. The assembly 60 includes an abraded silver anode plate 62 and a cathode bar 64 supported at their ends in a spaced relationship by a plug 66 and a spacer 68 both made of electrically insulating material such as silicone rubber. A plurality of nuts 70 are rigidly fastened to the anode plate 62 by screws 72, with a trace of sodium acetate trihydrate in the form of molecular clusters or crystalline powders is similarly retained between the anode plate 62 and the respective nuts 70. With this arrangement, a plurality of nucleation sites are provided along the length of the anode plate 62. Accordingly, even if nucleation fails at one site for any reason, nucleation will occur at one or more other sites. Therefore, the reliability and durability is increased so that the electrode assembly 60 may be operated for an extended period of time.

Figure 10B:
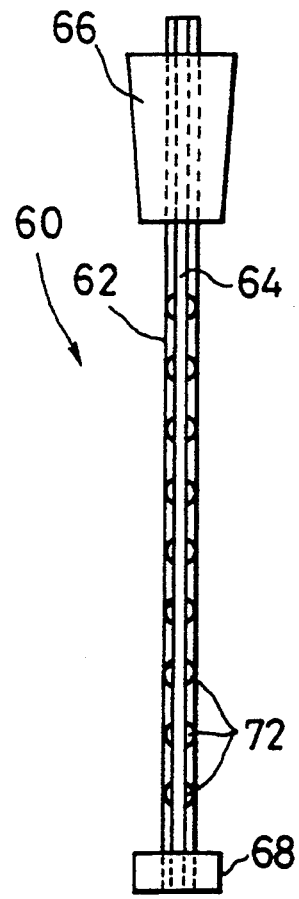
Figure 11:
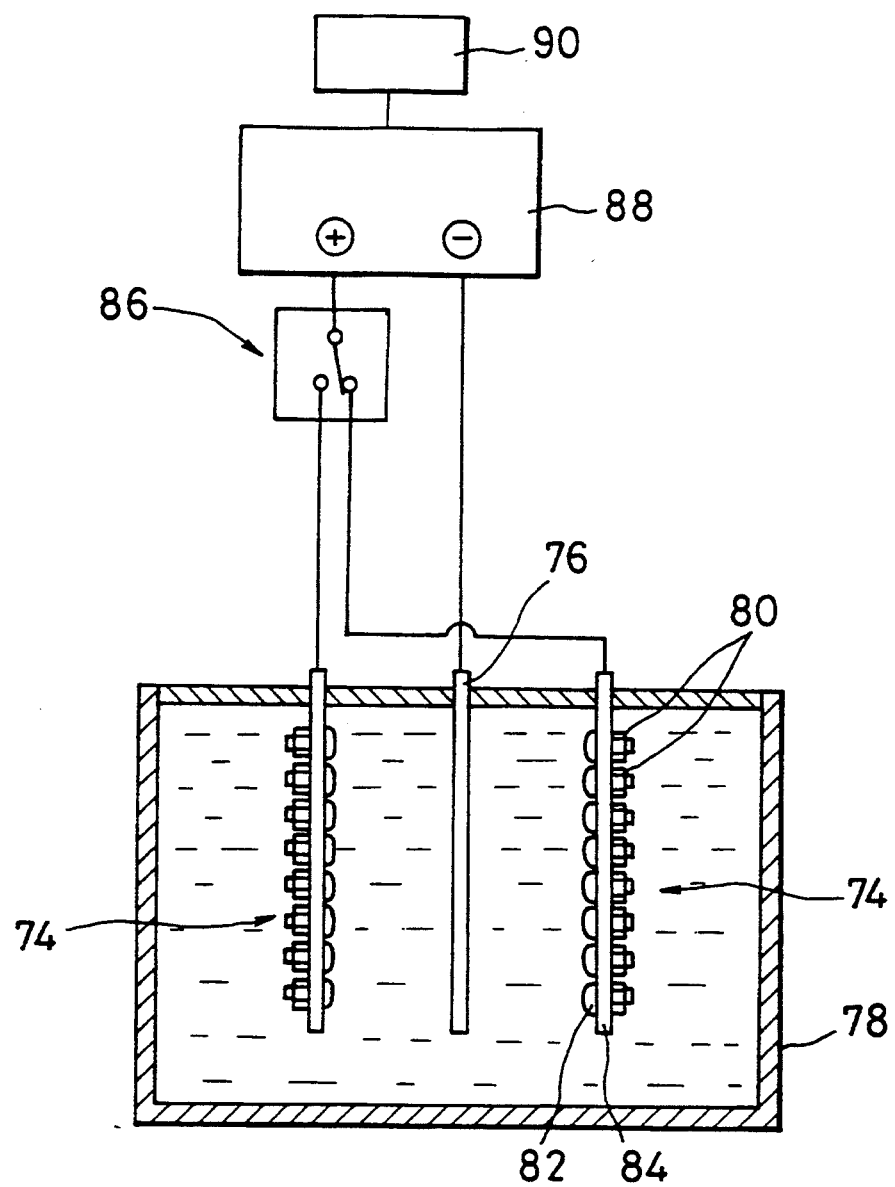
FIG. 11 is a schematic cross-sectional view of another embodiment of the invention as installed in a heat storage system.

In the embodiment shown in FIG. 11, the nucleation device includes a pair of anode assemblies 74 and a single cathode 76 which are mounted to the reservoir 78 for the heat storage medium. Each anode assembly 74 is provided with a plurality of nuts 80 fastened by associated screws 82 to the anode plate 84 in a similar manner to the arrangement shown in FIGS. 10A and 10B. A trace of sodium acetate trihydrate in the form of molecular clusters or crystalline powders is similarly retained between the anode plate 84 and respective nuts 80. The anode assemblies 74 are connected through a switch 86 to a DC power source 88 and are adapted to be signalled by an electronic control 90. The switch 86 is designed to selectively connect either one of the anode assemblies 74 to the power source 88. When one of the anode assemblies 74 is degraded for any reasons, the switch 86 may be changed over to the other anode assembly. Accordingly, the service life of the nucleation device can be duplicated.

Figure 12:
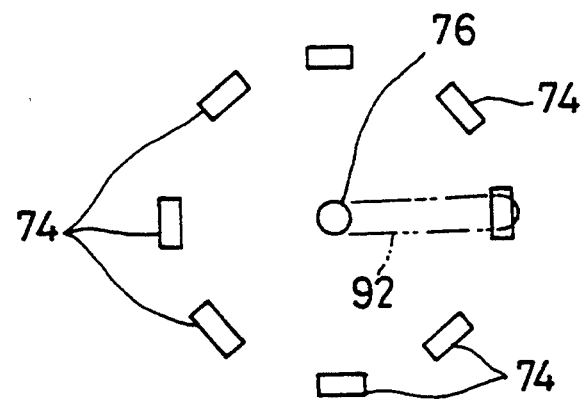
FIG. 12 is a schematic top plan view showing another layout of anode assemblies; and, FIG. 13 is a cross-sectional view showing an example of application of the nucleation device.

FIG. 12 illustrates another layout of the anode assemblies which may be used instead of the arrangement shown in FIG. 11. In this layout, a plurality of anode assemblies 74 identical to those shown in FIG. 11 are arranged circumferentially equally spaced from each other and are adapted to be selectively connected to the power source 88 by way of a rotary switch 92. If either of the anode assemblies 74 is degraded or fails, the rotary switch 92 may be changed over in sequence to the next anode assembly.

Figure 13:
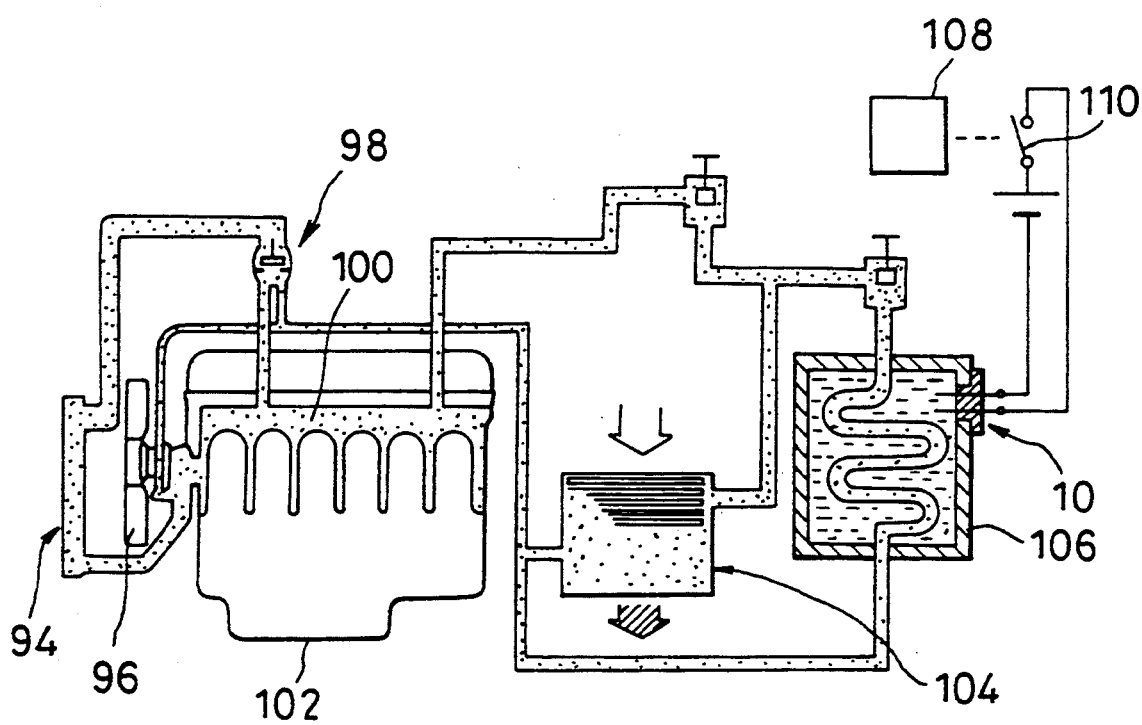

FIG. 13 illustrates, by way of an example, the nucleation device according to the invention as applied to an automotive engine cooling and air conditioning system. As is well-known in the art, the engine cooling system may include a radiator 94, an engine-driven fan 96, a thermostat 98 and a water jacket 100 formed in the engine 102. The engine coolant is also circulated in a conventional manner to a heat exchanger 104 for room air conditioning. The coolant may be further circulated through a heat storage reservoir 106 wherein a suitable heat storage medium such as sodium acetate trihydrate is received and which is provided with the electrical nucleation device 10 according to the invention.

When the engine is operating, a part of the engine coolant may be circulated through the heat storage tank 106 to liquefy the heat storage medium whereby the latent heat is stored. As engine operation is ceased and the engine is allowed to cool, the heat storage medium will be supercooled. When the engine is restarted, a control 108 closes a switch 110 to energize the nucleation device 10 whereupon crystallization of the supercooled heat storage medium is induced as mentioned hereinbefore. As a result, the latent heat stored in the heat storage medium is evolved to quickly heat the engine coolant before the engine is warmed up. In this application, therefore, the heat storage system may be used to accelerate engine warming or to heat the vehicle room quickly at the time of cold restart of the engine.

While the present invention has been described herein with reference to the specific embodiments thereof, it is contemplated that the invention is not limited thereby and various modifications and alterations may be made therein without departing from the scope of the invention. For example, the electrode assembly has been described as being operated by DC power to serve as an anode. However, AC power may be equally applied thereto.

What I claim is:

1. An electric nucleation device for inducing formation of crystal nuclei in a supercooled liquid of hydrate of salt serving as a heat storage medium, said device comprising:
   a pair of spaced electrodes adapted to be brought in contact with a mass of supercooled liquid of hydrate of salt in use, at least one of electrodes being made of a metal and having a roughened surface;
   a rigid member affixed to said one of electrodes in tight mechanical contact therewith for closely covering at least in part the surface of said one of electrodes;

a trace of said hydrate of salt in the form of molecular clusters thereof retained between said one of electrodes and said rigid member; and, means for applying electric voltage between said electrodes.

2. A nucleation device according to claim 1, wherein, for use with a heat storage medium containing trihydrate of sodium acetate, said trace of hydrate of salt includes molecular clusters of trihydrate of sodium acetate.

3. A nucleation device according to claim 2, wherein said one of electrodes is made of a metal selected from the group consisting of silver, palladium and lead.

4. An electric nucleation device for inducing crystallization of a supercooled liquid of hydrate of salt serving as a heat storage medium, said device comprising:

a pair of spaced electrodes, at least one of electrodes being made of a metal and having a roughened surface;

a rigid member affixed to said one of electrodes in tight mechanical contact therewith for closely covering at least in part the surface of said one of electrodes;

crystalline particles of said hydrate of salt retained between said one of electrodes and said rigid member; and, means for applying electric voltage between said electrodes;

said nucleation device being adapted, prior to voltage application, to be heated above the melting point of said hydrate of salt to cause said crystalline particles to melt to derive molecular clusters thereof.

5. A nucleation device according to claim 4, wherein, for use with a heat storage medium containing trihydrate of sodium acetate, said crystalline particles include particles of trihydrate of sodium acetate.

6. A nucleation device according to claim 5, wherein said one of electrodes is made of a metal selected from the group consisting of silver, palladium and lead.

7. An electric nucleation device for inducing formation of crystal nuclei in a supercooled liquid of hydrate of salt serving as a heat storage medium, said device comprising:

a first electrode;

a plurality of spaced metallic second electrodes each having a roughened surface;

a plurality of rigid members affixed one to each of said second electrodes in tight mechanical contact therewith for closely covering at least in part the surface of each of said second electrodes;

a trace of said hydrate of salt in the form of molecular clusters or crystalline particles thereof retained between each of said second electrodes and each of associated rigid members; and, means for applying electric voltage selectively between said first electrode and selected one of said second electrodes.

* * * * *